Patented Apr. 1, 1941

2,237,263

UNITED STATES PATENT OFFICE 2,237,263

PROCESS OF PREPARING ALDEHYDO ACYLATED RIBOSE, AND PRODUCT THEREOF

Richard Pasternack, Brooklyn, and Ellis V. Brown, Jamaica, N. Y., assignors to Charles Pfizer & Company, Brooklyn, N. Y., a corporation of New Jersey No Drawing. Application December 16, 1939, Serial No. 309,700

6 Claims. (Cl. 260—210)

This invention relates to a process for the preparation of aldehydo acylated ribose from arabonic acid, and to the intermediate products developed by the process. Hitherto ribose has been known only in its lactol form, produced, for example, by Emil Fischer's method of reducing ribonolactone with sodium amalgam. We have now found that by the following sequence of reactions, it is possible to make a substituted aldehydoribose which is most suitable for synthetic purposes.

In practice it is convenient to use calcium arabonate as the starting material. Arabonic acid is set free from this salt by treatment with the calculated amount of sulfuric acid and epimerized by heating with pyridine. Ribonolactone is recovered according to the method of Fischer and Piloty (Ber. 24: 4214, 1891). If d-ribonolactone in absolute ethyl alcohol is treated with dry ammonia, it gives d-ribonamide, small plates of melting point 136–137° C. Initial rotation in aqueous solution $$[\alpha]_D^{20°} + 16°$$

Ribonamide, by treatment with acid anhydrides or chlorides and pyridine, is converted to the corresponding derivative with its hydroxyl groups fully substituted, by the acetylation method of Behrend and Roth (Ann. 331: 359–82; Behrend, Ann. 353: 106–122). Anhydrides or chlorides of aliphatic or aromatic acids may be used, but anhydrides are in general preferable to chlorides, and for many purposes acetic anhydride is best suited.

The tetraacylated ribonamide is converted to tetraacylated ribonic acid by means of nitrous anhydride according to the method of Hurd and Sowden (J. Am. Chem. Soc. 60: 235–7, 1938). This is converted to the acid chloride by treatment with phosphorus pentachloride. The tetraacylated ribonyl chloride is then reduced to tetraacyl ribose by the method of Rosenmund and Zetsche (Ber. 51: 585 and 595, 1918) using hydrogen with a palladium catalyst, precipitated on barium sulfate.

While calcium arabonate, ribonic acid and its lactone, and l-ribonamide are of course known in the art, there is no evidence that either aldehydo acylated ribose or any of the tetraacylated intermediate compounds produced in our process have ever before existed. Levene and Tipson (J. Biol. Chem. 92: 110) produced a tetraacetyl ribose, but this could not have been in the aldehydo form, since it is known in the art that aldehydopentose acetates do not form by direct acetylation. The distinction from our product is further emphasized by the physical constants, which Levene and Tipson found to be: Melting point 110° and $$[\alpha]_D^{24°} - 52°$$

(in chloroform).

Examples of the steps of our process are as follows:

*Preparation of tetraacetyl-ribonamide.*—1000 grams of d-ribonamide is added gradually with stirring to a mixture of 3500 cc. pyridine and 3500 cc. acetic anhydride. The temperature tends to rise rapidly owing to heat of reaction. This is prevented by outside cooling and agitation, since at elevated temperatures there is a considerable darkening of the material and the yield is substantially reduced. It is preferable to maintain the temperature below 40° C. After standing over night, the pyridine and acetic acid are distilled off and the tetraacetylribonamide product crystallized from methyl alcohol. (Melting point 123° C.;

$$[\alpha]_D^{25°} - 26.3°$$

for c, 5% in methyl alcohol.)

When propionic anhydride is used instead of acetic anhydride, the preferable amount is about 4500 cc. The tendency toward temperature rise is not so marked, but it is still advisable to apply sufficient cooling effect to keep the solution below 40° C. The tetrapropionyl ribonamide crystallized from methyl alcohol has a melting point of 123–124° C. and $$[\alpha]_D^{25°} - 22.5°$$

at c, 5% in methyl alcohol.

*Preparation of tetraacetyl-d-ribonic acid.*—100 grams of tetraacetyl-d-ribonamide is dissolved in 150 cc. of glacial acetic acid and treated with the gas obtained by reacting 200 grams of NaNO₂ with an excess of sulfuric acid. After the resulting nitrogen gas ceases to be evolved, the acetic acid is distilled. The residue is dissolved in aqueous sodium bicarbonate solution and precipitated with hydrochloric acid. The melting point of the resulting tetraacetyl-d-ribonic acid is 138–139° C.;

$$[\alpha]_D^{25°} - 27.3°$$

at c, 5% in acetic acid;

$$[\alpha]_D^{25°} - 29.5°$$

at c, 5% in ethyl acetate.

If tetrapropionyl-d-ribonamide is used as the starting material, the amount is about 117 grams instead of 100 grams, but the process is not substantially different.

*Preparation of tetraacetyl-d-ribonyl chloride.*— 300 grams of tetraacetyl-d-ribonic acid is dissolved in 500 cc. of dry CHCl₃ and reacted with 225 grams of PCl₅. At the end of this reaction, the chloroform and phosphorus oxychloride are distilled. The residue of tetraacetyl-d-ribonyl chloride is crystallized from dry xylene and has a melting point of 75° C.

*Preparation of tetraacetyl-d-ribose.*—Hydrogen is bubbled into a boiling mixture of 200 grams of tetraacetyl-d-ribonyl chloride and 75 grams of 5% Pd—BaSO₄ catalyst in 500 cc. of dry xylene under reflux. HCl is driven off and when HCl evolution stops, the reaction mixture is filtered. Tetraacetyl-d-ribose crystallizes and is collected and recrystallized from dry xylene and has a melting point of 98–99° C. and $$[\alpha]_D^{20°} - 16.7°$$

at c, 5% in acetone.

We claim:

1. Process of preparing aldehydo tetraacylated ribose from ribonamide, comprising acylation of ribonamide by heating with pyridene and a member selected from the group consisting of the anhydrides and chlorides of the lower fatty acids, converting the resulting acylated amide to the corresponding acylated acid by the action of nitrous anhydride, treating the tetraacylated product with phosphorus pentachloride to form the corresponding acylated acid chloride, and reducing the latter with hydrogen at atmospheric pressure in the presence of a palladium catalyst to form the corresponding aldehydo acylated ribose.

2. As new products, ribonyl derivatives of the formula AOH₂C·(CHOA)₃·CO—R, where A represents an acyl radical selected from the group consisting of the lower fatty acids and R represents any member of the group consisting of NH₂, OH, Cl and H.

3. As a new product, tetrapropionyl ribonamide.
4. As a new product, tetraacetyl ribonamide.
5. As a new product, tetraacetyl ribonic acid.
6. As a new product, aldehydo tetraacetyl ribose.

RICHARD PASTERNACK.
ELLIS V. BROWN.

DISCLAIMER 2,237,263.—*Richard Pasternack*, Brooklyn, and *Ellis V. Brown*, Jamaica, N. Y. PROCESS OF PREPARING ALDEHYDO ACYLATED RIBOSE, AND PRODUCT THEREOF. Patent dated April 1, 1941. Disclaimer filed May 12, 1942, by the inventors; the assignee, *Charles Pfizer & Company*, consenting.

Hereby enter this disclaimer to claims 2, 4, and 5 of said Letters Patent.

[*Official Gazette June 9, 1942.*]